United States Patent
Kim et al.

(10) Patent No.: US 10,089,455 B2
(45) Date of Patent: Oct. 2, 2018

(54) ELECTRONIC DEVICE AND METHOD FOR CONTROLLING LOCKING OF ELECTRONIC DEVICE

(71) Applicant: Samsung Electronics Co., Ltd., Gyeonggi-do (KR)

(72) Inventors: Ihl-Ho Kim, Gangwon-do (KR); Jun-Sik Kwon, Gyeonggi-do (KR); Joo-Hyung Lee, Seoul (KR); Eui-Bum Han, Gyeonggi-do (KR); Ji-Seon Hong, Gyonggi-do (KR); Veerabhadrappa Chilakanti, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/916,123

(22) PCT Filed: Sep. 2, 2014

(86) PCT No.: PCT/KR2014/008213
§ 371 (c)(1),
(2) Date: Mar. 2, 2016

(87) PCT Pub. No.: WO2015/030565
PCT Pub. Date: Mar. 5, 2015

(65) Prior Publication Data
US 2016/0224778 A1 Aug. 4, 2016

(30) Foreign Application Priority Data
Sep. 2, 2013 (KR) .................. 10-2013-0104813

(51) Int. Cl.
*H04L 29/06* (2006.01)
*G06F 21/35* (2013.01)
(Continued)

(52) U.S. Cl.
CPC .......... *G06F 21/35* (2013.01); *H04B 17/318* (2015.01); *H04W 4/80* (2018.02); *H04W 12/08* (2013.01)

(58) Field of Classification Search
CPC .......................... G06F 21/35; H04L 63/0853
See application file for complete search history.

(56) References Cited

U.S. PATENT DOCUMENTS 5,821,854 A  10/1998  Dorinski et al.
7,257,374 B1  8/2007  Creigh
(Continued)

FOREIGN PATENT DOCUMENTS

CN  1984411  6/2007
EP  2 738 706  6/2014
(Continued)

OTHER PUBLICATIONS

PCT/ISA/210 Search Report issued on PCT/KR2014/008213 (pp. 3).
(Continued)

Primary Examiner — Jason K Gee
(74) Attorney, Agent, or Firm — The Farrell Law Firm, P.C.

(57) ABSTRACT

An electronic device and method for controlling locking of an electronic device are disclosed. An electronic device includes a short-range communication unit for performing short-range communication and a controller for controlling locking of the electronic device by using an RSSI value of a counterpart electronic device connected by short-range communication through the short-range communication unit and a transmission strength value of the counterpart electronic device to control the locking of the electronic device.

6 Claims, 4 Drawing Sheets

(51) Int. Cl.
*H04W 12/08* (2009.01)
*H04B 17/318* (2015.01)
*H04W 4/80* (2018.01)

(56) References Cited

U.S. PATENT DOCUMENTS

| | | |
|---|---|---|
| 2004/0203895 A1 | 10/2004 | Balasuriya |
| 2007/0135045 A1 | 6/2007 | Son et al. |
| 2007/0232270 A1 | 10/2007 | Ohkubo et al. |
| 2011/0195665 A1* | 8/2011 | Friedlaender .......... G08C 17/02 455/41.2 |
| 2011/0218709 A1 | 9/2011 | Hermann |
| 2012/0040623 A1* | 2/2012 | Liu ....................... G06F 1/3203 455/67.13 |
| 2013/0154843 A1 | 6/2013 | Lan |
| 2013/0298208 A1* | 11/2013 | Ayed ....................... G06F 21/00 726/6 |
| 2014/0049361 A1* | 2/2014 | Ahearn .............. G07C 9/00309 340/5.7 |

FOREIGN PATENT DOCUMENTS

| | | |
|---|---|---|
| KR | 1020070097368 | 10/2007 |
| KR | 1020090120967 | 11/2009 |
| KR | 1020110100157 | 9/2011 |
| KR | 1020120086428 | 8/2012 |
| KR | 1020130010975 | 1/2013 |
| WO | WO 2014/143916 | 9/2014 |

OTHER PUBLICATIONS

European Search Report dated Jan. 31, 2017 issued in counterpart application No. 14840960.0-1870, 5 pages.
Chinese Office Action dated Jan. 11, 2018 issued in counterpart application No. 201480048434.7, 22 pages.

\* cited by examiner

ELECTRONIC DEVICE AND METHOD FOR CONTROLLING LOCKING OF ELECTRONIC DEVICE

PRIORITY

This application is a National Phase Entry of PCT International Application No. PCT/KR2014/008213, which was filed on Sep. 2, 2014, and claims priority to Korean Patent Application No. 10-2013-0104813, which was filed on Sep. 2, 2013, the contents of each of which are incorporated herein by reference.

BACKGROUND

1. Field of the Disclosure

The present disclosure generally relates to electronic devices and methods for controlling the locking of electronic devices, and more particularly, to electronic devices and methods that conveniently lock or unlock the electronic devices.

2. Description of the Related Art

An electronic device may be set with a locking function at the request of the user to maintain the security of the electronic device. The locking function may include entering a pattern or password. To release the locking function set in the electronic device, a preset pattern or password should be entered.

However, such locking functions, although for the purpose of enhancing security, may be a trade-off between security and user convenience because it requires the user to enter the preset pattern or password whenever the electronic device requires unlocking.

SUMMARY

According to various aspects of the present disclosure, an electronic device and method for controlling the locking of the electronic device are provided that conveniently lock or unlock the electronic device.

According to various aspects of the present disclosure, an electronic device and method for controlling the locking of the electronic device are provided that lock or unlock the electronic device without the user's input while the electronic device is in a short-range communication range.

According to various aspects of the present disclosure, the electronic device and method for controlling the locking of the electronic device may provide convenience and security by allowing the electronic device to be locked or unlocked without the user's input.

According to various aspects of the present disclosure, an electronic device includes a short-range communication unit for performing short-range communication and a controller for controlling locking of the electronic device using an RSSI value of a counterpart electronic device which is connected through the short-range communication unit and the transmit strength value of the counterpart electronic device to control the locking of the electronic device.

According to various aspects of the present disclosure, an electronic device includes a short-range communication unit and if an RSSI value of a counterpart electronic device connected via short-range communication is less than a preset RSSI reference range, transmits a message indicating that the RSSI value of the counterpart electronic device is less than the lowest RSSI value to a controller, and a controller when receiving the message indicating that the RSSI value of the counterpart electronic device is less than the lowest RSSI value from the short-range communication unit, sends a request for a transmit strength value to the counterpart electronic device through the short-range communication unit, and when a transmit strength value received from the counterpart electronic device is greater than a preset transmit strength reference value, locks the electronic device.

According to various aspects of the present disclosure, a method for controlling locking of an electronic device includes performing short-range communication with a counterpart electronic device through a short-range communication unit and controlling the locking of the electronic device using an RSSI value of the short-range communication connected counterpart electronic device and a transmit strength value of the counterpart electronic device.

According to various aspects of the present disclosure, a method for controlling locking of an electronic device includes performing short-range communication with a counterpart electronic device through a short-range communication unit, an operation in which if the RSSI value of the counterpart electronic device is not more than a lowest RSSI value of a preset RSSI reference range, the short-range communication unit transmits a message indicating that the RSSI value of the counterpart electronic device is not more than the lowest RSSI value to the controller, an operation in which upon receiving the message that the RSSI value of the counterpart electronic device is not more than the lowest RSSI value of the preset RSSI reference range from the short-range communication unit, the controller sends a request for a transmit strength value to the counterpart electronic device through the short-range communication unit, and an operation in which if the transmit strength value from the counterpart electronic device is not less than a preset transmit strength reference value, the controller sets the locking of the electronic device.

According to various aspects of the present disclosure a method for controlling locking of an electronic device includes performing short-range communication with a counterpart electronic device through a short-range communication unit, transmitting, by the short-range communication unit, a message indicating that the RSSI value of the counterpart electronic device is less than the lowest RSSI value to the controller, if the RSSI value of the counterpart electronic device is less than a lowest RSSI value of a preset RSSI reference range, sending, by the controller, a request for a transmit strength value to the counterpart electronic device through the short-range communication unit, upon receiving the message that the RSSI value of the counterpart electronic device is less than the lowest RSSI value of the preset RSSI reference range from the short-range communication unit, and locking, by the controller, the electronic device if the transmit strength value from the counterpart electronic device is greater than a preset transmit strength reference value.

BRIEF DESCRIPTION OF THE DRAWINGS

The above and other aspects, features and advantages of embodiments of the present disclosure will be more apparent from the following detailed description taken in conjunction with the accompanying drawings, in which.

DETAILED DESCRIPTION

Figure 1:
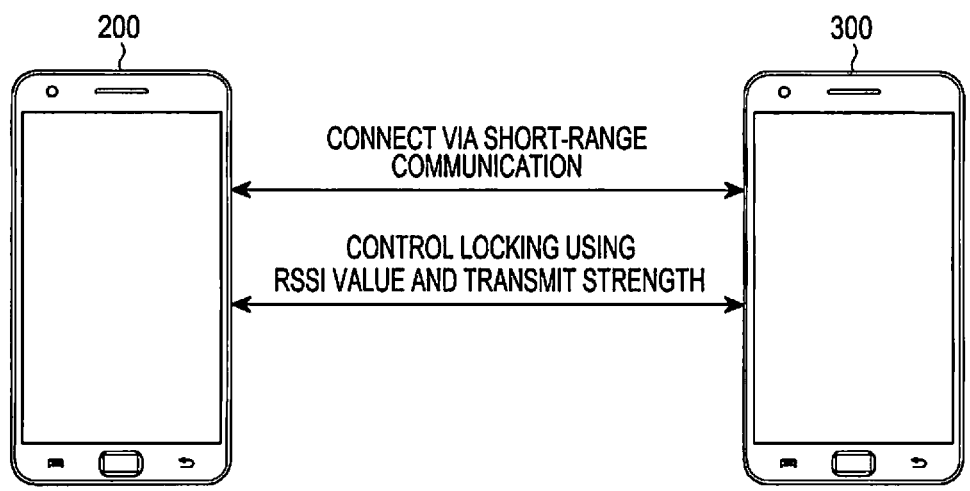
FIG. 1 is a view illustrating a locking control operation while electronic devices are in short-range communication according to various embodiments of the present disclosure.

Hereinafter, various embodiments of the present disclosure are described in detail with reference to the accompanying drawings. It should be noted that similar reference numerals refer to similar elements throughout the specification.

According to various embodiments of the present disclosure, an electronic device as disclosed herein may be a device with a communication function. For example, the electronic device may be one of various devices or a combination of a smartphone, a tablet personal computer (PC), a mobile phone, a video phone, an e-book reader, a desktop personal computer, a laptop personal computer, a netbook computer, a personal digital assistant (PDA), a portable multimedia player (PMP), an MP3 player, a mobile medical device, an electronic bracelet, an electronic necklace, an electronic appcessory, a camera, a wearable device, an electronic clock, a wrist watch, a home appliance (e.g., a refrigerator, an air conditioner, an oven, a microwave oven, a washer, or an air purifier), an artificial intelligence robot, a TV, a digital video disk (DVD) player, an audio player, various medical devices (e.g., a magnetic resonance angiography (MRA), a magnetic resonance imaging (MRI), a computed tomography (CT), an imaging device, or ultrasonic device), a navigation device, a global positioning system (GPS) receiver, an event data recorder (EDR), a flight data recorder (FDR), a set-top box, a TV box (e.g., Samsung HomeSync™, AppleTV™, or GoogleTV™), an electronic dictionary, a car infotainment device, electronic equipment for ships (e.g., navigators for ships or gyrocompasses), avionics, a security device, electronic clothes, an electronic key, a camcorder, a game console, a head-mounted display (HMD), a flat panel display device, an electronic picture frame, an electronic album, part of furniture or building/structure with a communication function, an electronic board, an electronic signature receiving device, a wearable device, or a projector. According to various embodiments of the present disclosure, the electronic device is not limited to the above-listed devices.

FIG. 1 is a view illustrating a locking control operation while electronic devices are in a short-range communication according to various embodiments of the present disclosure.

Referring to FIG. 1, the electronic device (hereinafter, a "first electronic device") 200 may include a short-range communication unit that performs first short-range communication, and a counterpart electronic device (hereinafter, a "second electronic device") 300 that may perform short-range communication with the first electronic device 200.

While performing short-range communication with the second electronic device 300 through the short-range communication unit, the first electronic device 200 may control the locking of the first electronic device 200 using an RSSI value of the second electronic device 300 and a transmit strength value (Tx power) of the second electronic device 300.

While performing short-range communication with the first electronic device 200 through the short-range communication unit, the second electronic device 300 may transmit a current transmit strength value to the first electronic device 200 at the request of the first electronic device 200.

Figure 2:
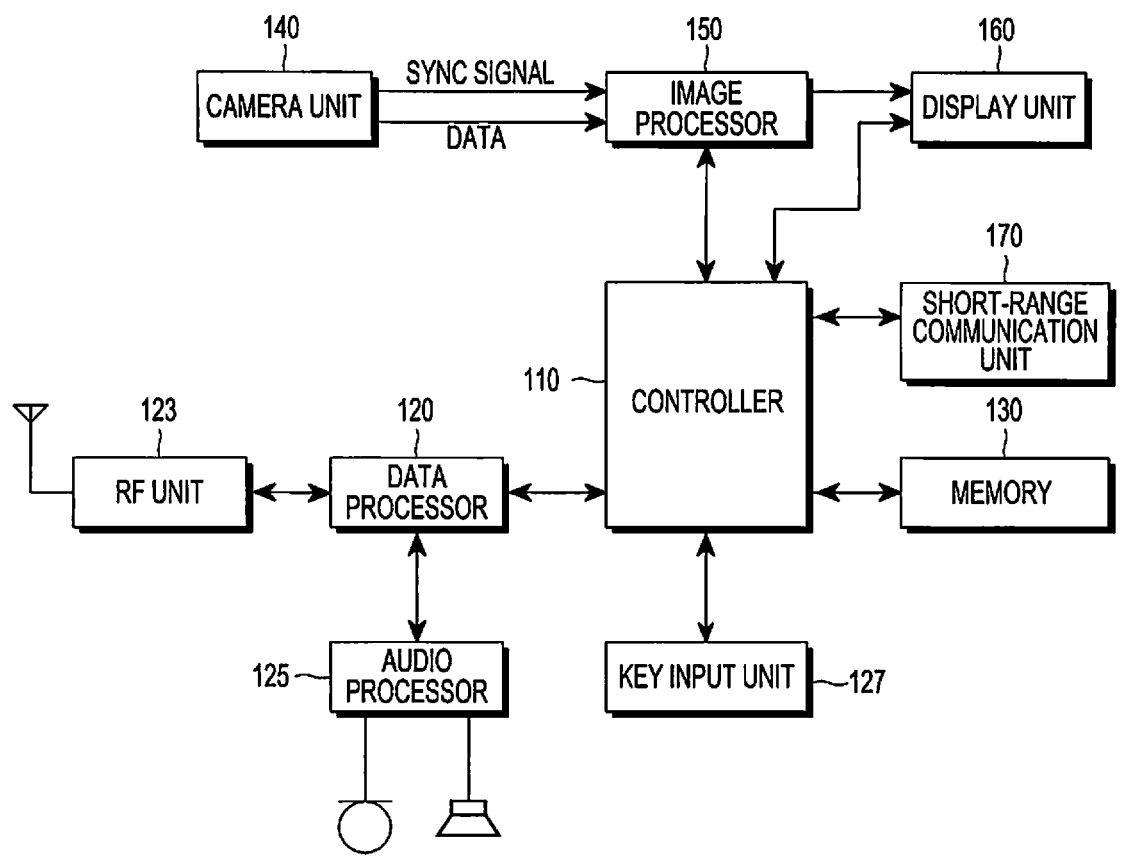
FIG. 2 is a view illustrating a configuration of an electronic device according to various embodiments of the present disclosure.

FIG. 2 is a view illustrating a configuration of an electronic device according to various embodiments of the present disclosure. The first electronic device 200 and the second electronic device 300 may have the same configuration as shown in FIG. 2.

Referring to FIG. 2, the RF unit 123 performs a radio communication function of the electronic device. The RF unit 123 includes an RF transmitter up-converting the frequency and amplifying the signal transmitted and an RF receiver with a low-noise amplifier receiving a signal and down-converting the frequency of the signal. The data processor 120 may include a transmitter for coding and modulating a signal to be transmitted and a receiver for decoding and demodulating the received signal. The data processor 120 may include a modem and a codec. The codec may include a data codec for processing packet data and an audio codec for processing audio signals such as voices. The audio processor 125 may perform a function of providing an audio signal output from the audio codec of the data processor 120 to a speaker or providing an audio signal generated from a microphone to the audio codec of the data processor 120.

The key input unit 127 may have keys for inputting numerical and character information and function keys for configuring various functions.

The memory 130 may include a program memory and data memory. The program memory may store programs for controlling general operation of the electronic device and programs for controlling the locking of the electronic device 200 using the RSSI value and transmit strength value while in short-range communication. Further, the data memory may temporarily store data generated while executing the programs.

The memory 130 may store a preset RSSI reference range to control the locking of the first electronic device 200 according to various embodiments of the present disclosure. The RSSI reference range may include a highest RSSI value for unlocking the electronic device and a lowest RSSI value for locking of the electronic device.

Further, the memory 130 may include a transmit strength reference value for comparison with a transmit strength value of the second electronic device in the short-range communication linkage in order to set the locking of the first electronic device 200 according to various embodiments of the present disclosure.

The controller 110 functions to control the overall operation of the first electronic device 200.

The controller 110 may control the locking of the first electronic device 200 using the RSSI value of the second electronic device 300 in short-range communication through the short-range communication unit 170 and the transmit strength value of the second electronic device 300 according to various embodiments of the present disclosure.

Further, the controller 110, upon receiving a message indicating that the RSSI value of the second electronic device 300 is less than the lowest RSSI value of the preset RSSI reference range from the short-range communication unit 170 according to various embodiments of the present disclosure, may send a request for a transmit strength value to the second electronic device 300 through the short-range communication unit 170. The controller 110, upon receiving the transmit strength value from the second electronic device 300 through the short-range communication unit 170, may compare the received transmit strength value with a preset transmit strength reference value, and when the received transmit strength value is greater than the preset transmit strength reference value, may lock the first electronic device 200.

Further, the controller 110, upon receiving a message indicating that the RSSI value of the second electronic device 300 is greater than the highest RSSI value of the preset RSSI reference range from the short-range communication unit 170 according to various embodiments of the present disclosure, may identify the locking state of the electronic device, and if the first electronic device 200 is locked, may unlock the first electronic device 200.

The camera unit 140 may include a camera sensor that captures an optical image signal and converts a captured optical image signal into an electrical signal and a signal processor that converts an optical image signal captured by the camera sensor into digital data. The camera sensor may include a charge coupled device (CCD) or complementary metal oxide semiconductor (CMOS) sensor, and the signal processor may be implemented as a digital signal processor (DSP). Further, the camera sensor and the signal processor may be implemented in a single unit or may be implemented separately.

The image processor 150 performs image signal processing (ISP) to display an image signal output from the camera unit 140 to the display unit 160, and the ISP performs functions such as gamma correction, interpolation, spatial variation, image effects, image scaling, automatic white balance (AWB), auto exposure (AE), or auto focus (AF). Accordingly, the image processor 150 processes an image signal output from the camera unit 140 on a per-frame basis and outputs the frame image data fitting into the characteristics and size of the display unit 160. Further, the image processor 150 includes an image codec and compresses the frame image data displayed on the display unit 160 in a preset manner and restores the compressed frame image data to the original frame image data. Here, the image codec may be, e.g., a joint photographic experts group (JPEG) codec, a moving pictures expert group (MPEG) codec, or a Wavelet codec. The image processor 150 assumes an on-screen display (OSD) function and may output OSD data according to the size of the screen displayed under the control of the controller 110.

The display unit 160 may display an image signal output from the image processor 150 on the screen and may display user data output from the controller 110. The display unit 160, may be a liquid crystal display (LCD). In such a case, the display unit 160 may include an LCD controller, a memory for storing image data, and an LCD display device. When the LCD is implemented in a touchscreen manner, the LCD may be operated as an input unit, and the display unit 160 may display keys such as the key input unit 127.

Further, in case the display unit 160 is implemented in a touchscreen manner and is used as a touchscreen unit, the touchscreen unit may include a touchscreen panel (TSP) including a plurality of sensor panels, and the plurality of sensor panels may include a capacitive sensor panel that may recognize a hand touch and an electromagnetic induction sensor panel that may sense a fine touch such as a touch pen.

The short-range communication unit 170 may provide a short-range radio communication function. The short-range communication unit 170 may include Bluetooth communication, low-power Bluetooth low energy (BLE) communication, infrared (IR) communication, near field communication (NFC), or wireless fidelity (Wi-Fi) communication.

According to various embodiments of the present disclosure, the short-range communication unit 170 may detect the RSSI value of the second electronic device 300 connected through short-range communication, and if the detected RSSI value is less than the lowest RSSI value of the preset RSSI reference range, may transmit a message indicating that the RSSI value of the second electronic device 300 is less than the lowest RSSI value to the controller 110.

According to various embodiments of the present disclosure, the short-range communication unit 170 may detect the RSSI value of the second electronic device 300 connected through short-range communication, and if the detected RSSI value is greater than the highest RSSI value of the preset RSSI reference range, may transmit a message indicating that the RSSI value of the second electronic device 300 is greater than the highest RSSI value to the controller 110.

According to various embodiments of the present disclosure, when a request for the current transmit strength value (Tx Power) is sent to the first electronic device 200 connected via the short-range communication, the short-range communication unit 170 may transmit the current transmit strength value of the first electronic device 200 to the second electronic device 300. A locking control operation of the first electronic device 200 while the first electronic device 200 and the second electronic device 300, having the above-described configuration, are connected via short-range communication, is described in detail with reference to FIGS. 3 and 4.

Although the first electronic device 200 and the second electronic device 300 each include the controller 110 and the short-range communication unit 170 as shown in FIG. 2, an example in which the first electronic device 200 includes a controller A and a short-range communication unit A, and the second electronic device 300 includes a short-range communication unit B, is described in the same configuration in a differentiated manner.

Figure 3:
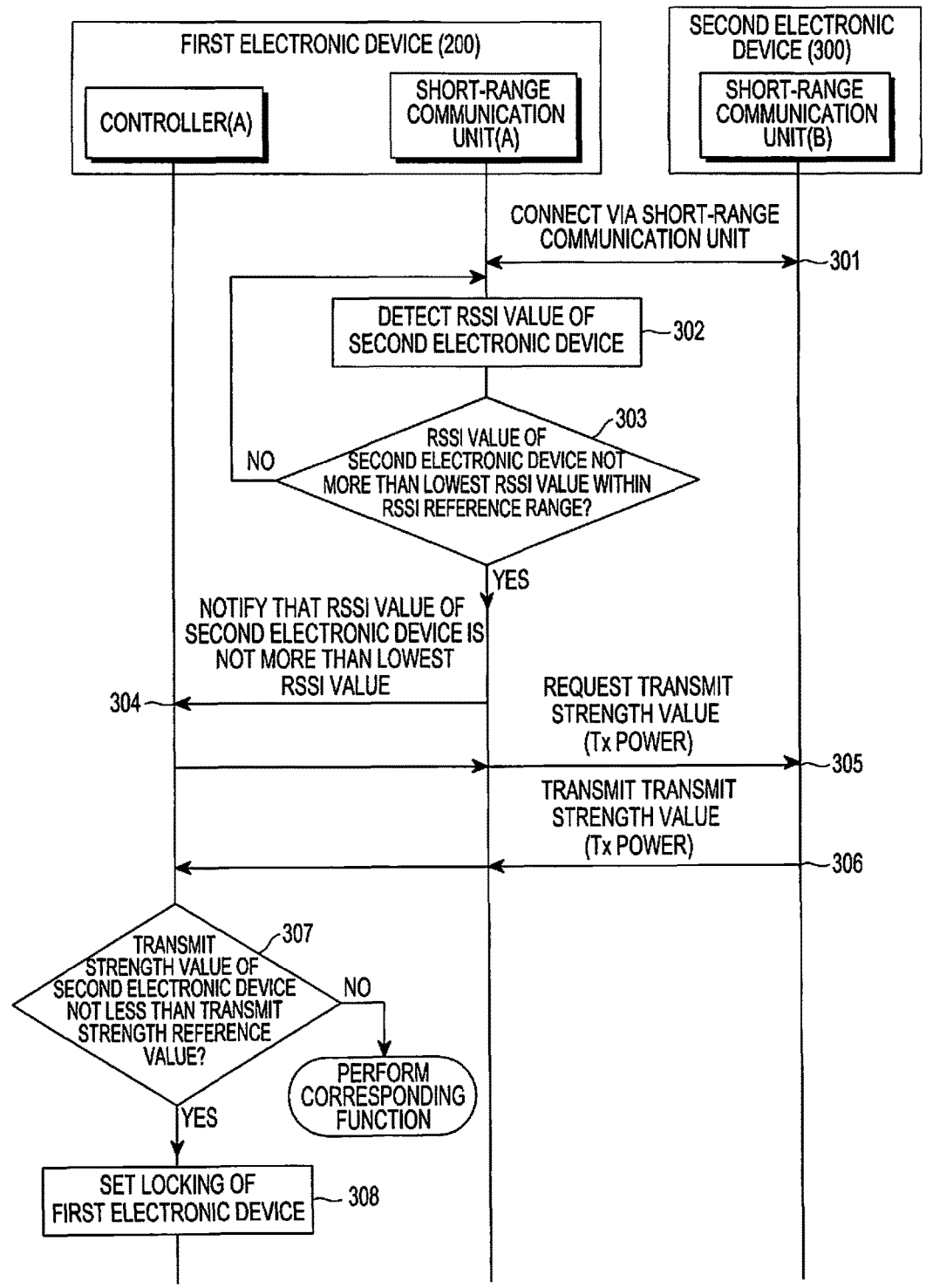
FIG. 3 is a flowchart illustrating a locking control operation while an electronic device is in short-range communication according to an embodiment of the present disclosure.

FIG. 3 is a flowchart illustrating a locking control operation while an electronic device is in short-range communication according to an embodiment of the present disclosure. Hereinafter, the first embodiment of the present disclosure is described in detail with reference to FIGS. 1 and 2.

Referring to FIG. 3, in step 301 in which the first electronic device 200 and the second electronic device 300 are connected through the short-range communication unit A of the first electronic device 200 and the short-range communication unit B of the second electronic device 300, the short-range communication unit A performs step 302 of detecting the RSSI value of the second electronic device 300 connected via the short-range communication at predetermined times periods.

The short-range communication unit A determines whether the RSSI value of the second electronic device 300 detected in step 302 is outside a preset RSSI reference range.

Upon determining in step 303 that the RSSI value of the second electronic device 300 is outside the RSSI reference range and is less the lowest RSSI value of the RSSI reference range, the short-range communication unit A transmits, to the controller A, a message indicating that the RSSI value of the second electronic device 300 is less than the lowest RSSI value of the RSSI reference range in step 304.

Upon receiving the message indicating that the RSSI value of the second electronic device 300 is less than the lowest RSSI value of the RSSI reference range, the controller A switches from a sleep mode to a wake-up mode. The controller A sends a request for a transmit strength value (Tx power) to the short-range communication unit B of the second electronic device 300 through the short-range communication unit A in step 305.

In response to the request for the transmit strength value (Tx power) in step 305, the short-range communication unit B of the second electronic device 300 transmits the current transmit strength value (Tx power) of the second electronic device 300 through the short-range communication unit A to the controller A in the first electronic device 200 in step 306.

Upon receiving the transmit strength value from the short-range communication unit B of the second electronic device 300 through the short-range communication unit A in step 306, the controller A compares the received transmit strength value of the second electronic device 300 with a preset transmit strength reference value in step 307.

Upon determining in step 307 that the transmit strength value of the second electronic device 300 is greater than the preset transmit strength reference value, the controller A performs step 308 of locking the first electronic device 200.

Although it is described with reference to FIG. 3, that the controller A performs the step of requesting the RSSI value of the second electronic device 300 or the transmit strength value of the second electronic device 300, the short-range communication unit A may request the RSSI value of the second electronic device 300 or the transmit strength value of the second electronic device 300 and may transmit the RSSI value of the second electronic device 300 or the transmit strength value of the second electronic device 300 at the request of the controller A. In the operations shown in FIG. 3, the distance between the first electronic device 200 and the second electronic device 300 connected with the first electronic device 200 via short-range communication may be determined using the RSSI value and the transmit strength value, and in case the second electronic device 300 is a farther distance away than a predetermined range, the first electronic device 200 may be automatically locked, providing increased security to the user of the first electronic device 200.

Figure 4:
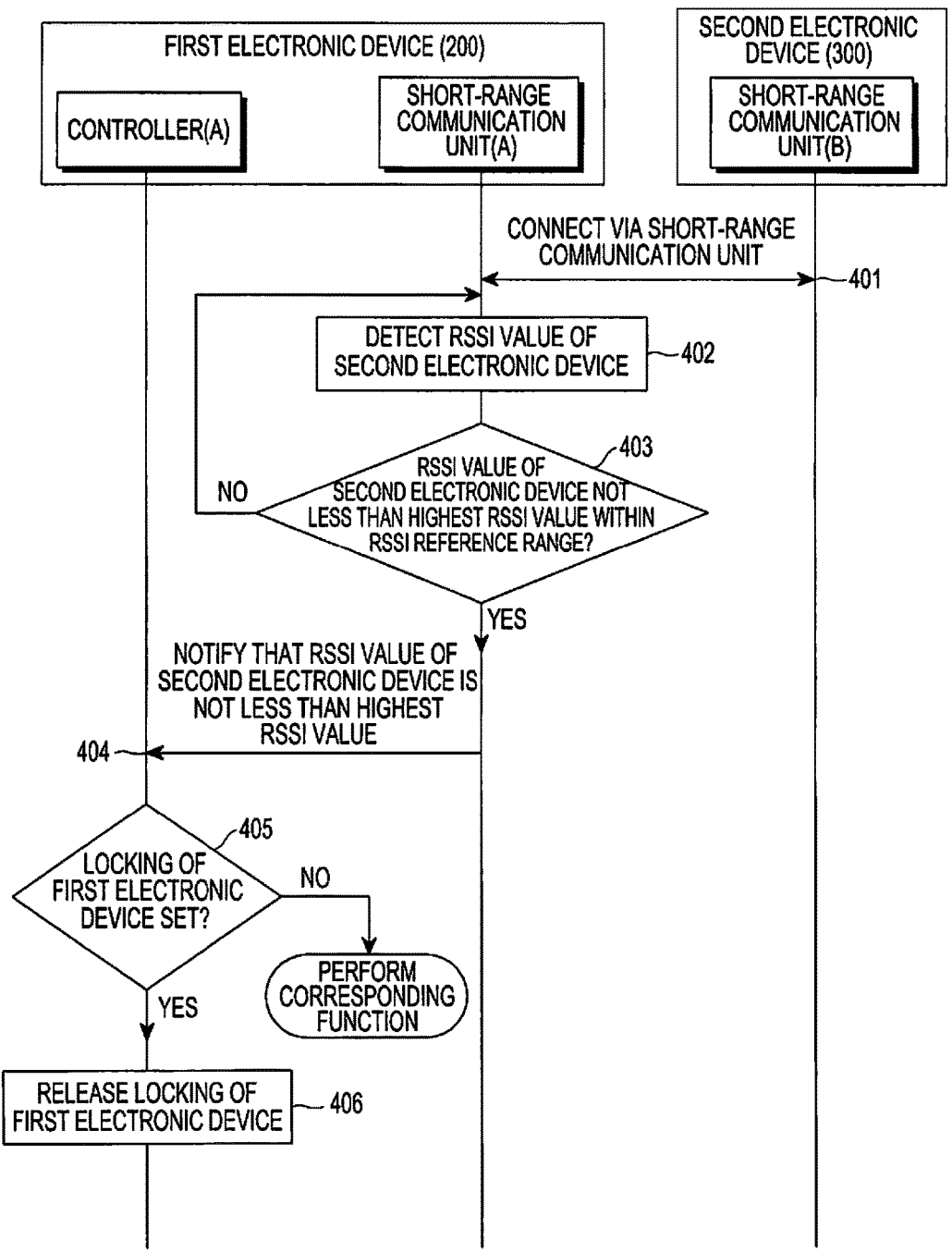
FIG. 4 is a flowchart illustrating a locking control operation while an electronic device is in short-range communication according to another embodiment of the present disclosure.

FIG. 4 is a flowchart illustrating a locking control operation while an electronic device is in short-range communication according to another embodiment of the present disclosure. Hereinafter, the second embodiment of the present disclosure is described in detail with reference to FIGS. 1 and 2.

Referring to FIG. 4, in step 401 where the first electronic device 200 and the second electronic device 300 are connected through the short-range communication unit A of the first electronic device 200 and the short-range communication unit B of the second electronic device 300, the short-range communication unit A performs step 402 of detecting the RSSI value of the second electronic device 300 connected via the short-range communication at predetermined time periods.

The short-range communication unit A determines whether the RSSI value of the second electronic device 300 detected in step 402 is outside a preset RSSI reference range.

Upon determining in step 403 that the RSSI value of the second electronic device 300 is outside the RSSI reference range and is greater than the highest RSSI value of the RSSI reference range, the short-range communication unit A transmits, to the controller A, a message indicating that the RSSI value of the second electronic device 300 is greater than the highest RSSI value of the RSSI reference range in step 404.

Upon receiving the message indicating that the RSSI value of the second electronic device 300 is greater than the highest RSSI value of the RSSI reference range, the controller A switches from a sleep mode to a wake-up mode. The controller A may identify the locking state of the first electronic device 200. If it is determined that the first electronic device 200 is locked in step 405, the controller A performs step 406 of unlocking the first electronic device 200.

In the operations shown in FIG. 4, the distance between the first electronic device 200 and the second electronic device 300 connected with the first electronic device 200 via short-range communication may be determined using the RSSI value, and in case the authenticated second electronic device 300 is positioned close to the first electronic device 200, the first electronic device 200 may be automatically unlocked, providing increased user convenience.

The electronic device and method for controlling the locking of the electronic device according to various embodiments of the present disclosure may be implemented as codes in a computer-readable recording medium. The computer-readable recording medium includes all types of recording devices storing data readable by a computer system. Examples of the recording medium include a ROM, a RAM, an optical disk, a magnetic tape, a floppy disk, a non-volatile memory, or carrier wave-type implementations (e.g., transmissions through the Internet). Further, the computer-readable recording medium may be distributed to computer systems connected via a network, and computer-readable codes may be stored and executed in a distributed manner.

Although the present disclosure has been described in connection with various embodiments thereof as illustrated in the drawings, these are merely examples, and it will be appreciated by one skilled in the art that various changes and other equivalents thereof may be made. Accordingly, the scope of the present disclosure should be determined by the appended claims and their equivalents.

The invention claimed is:
1. A mobile terminal, comprising:
a short-range communication unit configured to perform a short-range communication;
a touch screen configured to recognize a user input for the short-range communication with a wrist-worn wearable device;
a memory configured to store a predetermined received signal strength indicator (RSSI) value; and
a controller configured to:
  determine an RSSI value of a signal received at the mobile terminal through the short-range communication from the wrist-worn wearable device,
  change a locking state of the mobile terminal from a locked state to an unlocked state in response to detecting that the RSSI value of the signal is greater than the predetermined RSSI value, and
  change the locking state of the mobile terminal from the unlocked state to the locked state in response to detecting that the RSSI value of the signal is less than the predetermined RSSI value,
wherein the wrist-worn wearable device is a device which is authenticated in the mobile terminal, and
wherein the controller is configured to obtain a transmit strength value of the signal transmitted by the wrist-worn wearable device through the short-range communication from the wrist-worn wearable device when the RSSI value is less than a preset RSSI value and control the locking state of the mobile terminal using the transmit strength value of the wrist-worn wearable device.

2. The mobile terminal of claim 1, wherein the short-range communication unit comprises a short-wavelength ultra high frequency (UHF) radio wave low energy communication unit.

3. The mobile terminal of claim 1, wherein the controller is configured to maintain the locking state of the mobile terminal when the transmit strength value is greater than a preset strength value.

4. A method for controlling locking of a mobile terminal, the method comprising:
   establishing a short-range communication with a wrist-worn wearable device;
   setting a predetermined received signal strength indicator (RSSI) value;
   determining an RSSI value of a signal received through the short-range communication from the wrist-worn wearable device;
   changing a locking state of the mobile terminal from a locked state to an unlocked state in response to detecting that the RSSI value of the signal is greater than the predetermined RSSI value;
   changing the locking state of the mobile terminal of the mobile terminal from the unlocked state to the locked state in response to detecting that the RSSI value of the signal is less than the predetermined RSSI value;
   obtaining a transmit strength value of the signal transmitted by the wrist-worn wearable device through the short-range communication from the wrist-worn wearable device when the RSSI value is less than a preset RSSI value; and
   controlling the locking state of the mobile terminal using the transmit strength value of the wrist-worn wearable device,
   wherein the wrist-worn wearable device is a device which is authenticated in the mobile terminal.

5. The method of claim 4, wherein the short-range communication unit comprises a short-wavelength ultra high frequency (UHF) radio wave low energy communication unit.

6. The method of claim 4, further comprising:
   maintaining the locking state of the mobile terminal when the transmit strength value is greater than a preset strength value.

* * * * *